Sept. 2, 1969　　　　　J. C. SIMONS　　　　　3,465,285
VEHICLE APPROACH DIRECTION INDICATING APPARATUS
Filed April 5, 1967　　　　　　　　　　　3 Sheets-Sheet 1
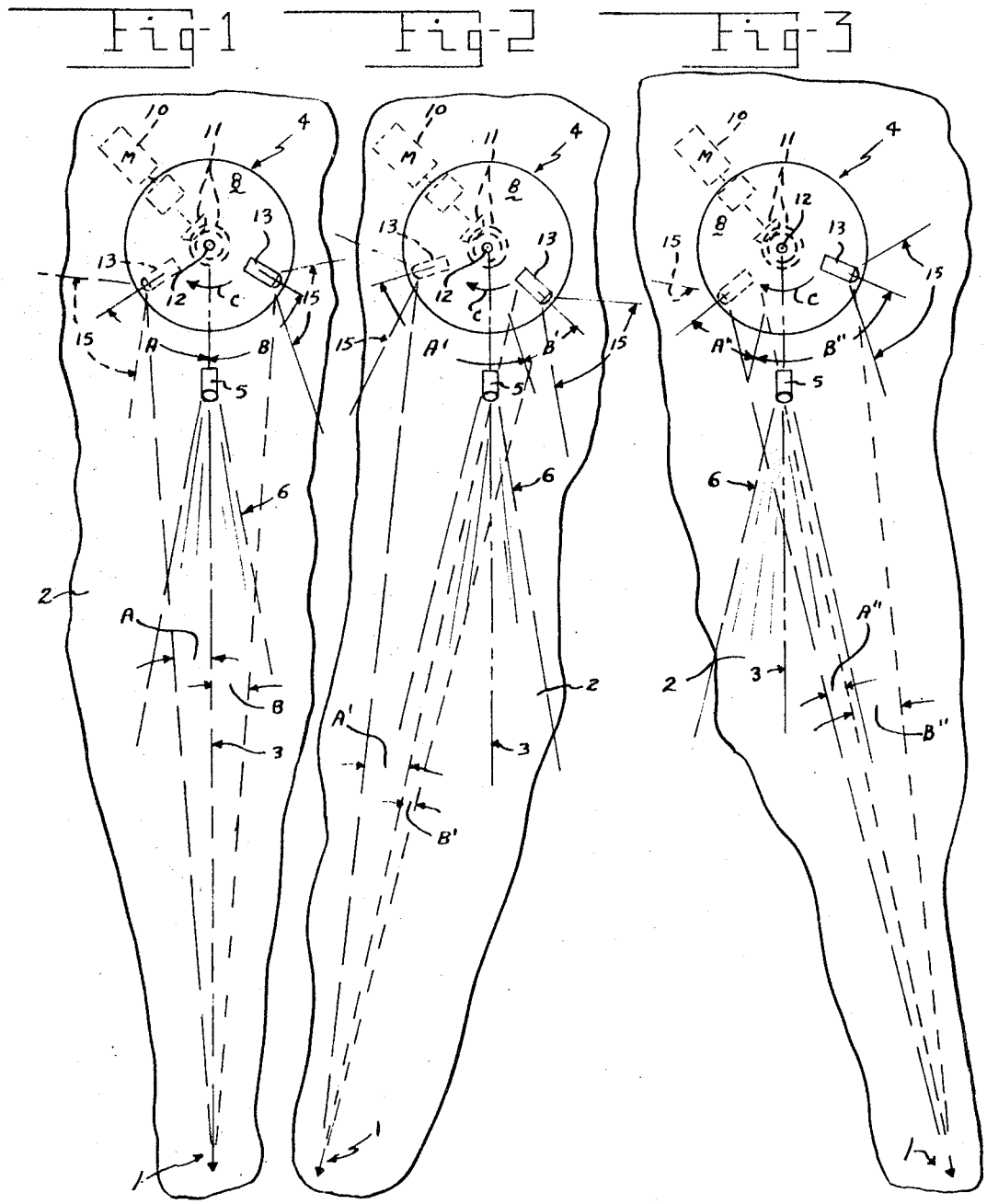
INVENTOR.
JOHN C. SIMONS
BY Harry A. Herbert Jr.
and Charles H. Wagner
ATTORNEYS Sept. 2, 1969    J. C. SIMONS    3,465,285
VEHICLE APPROACH DIRECTION INDICATING APPARATUS
Filed April 5, 1967    3 Sheets-Sheet 2
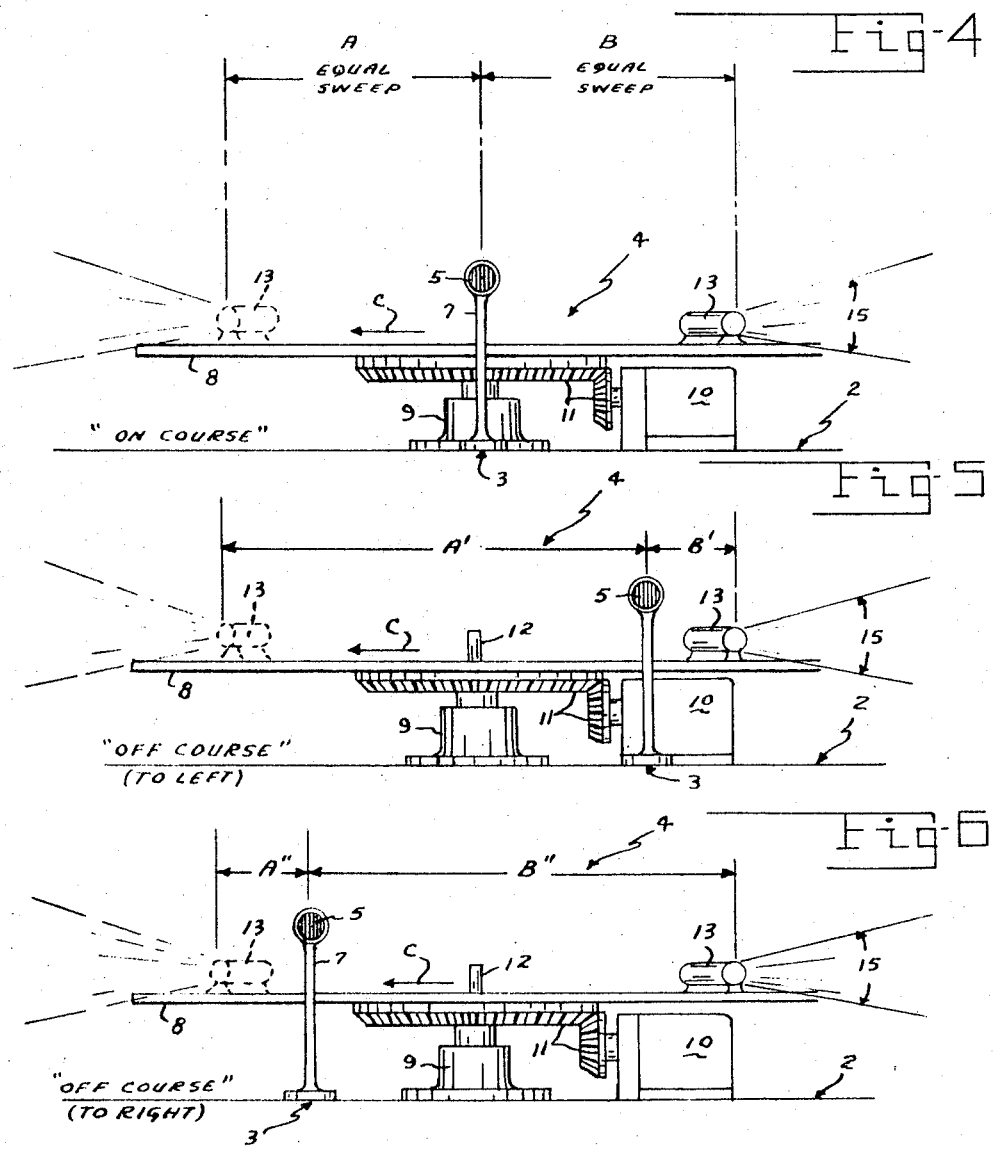

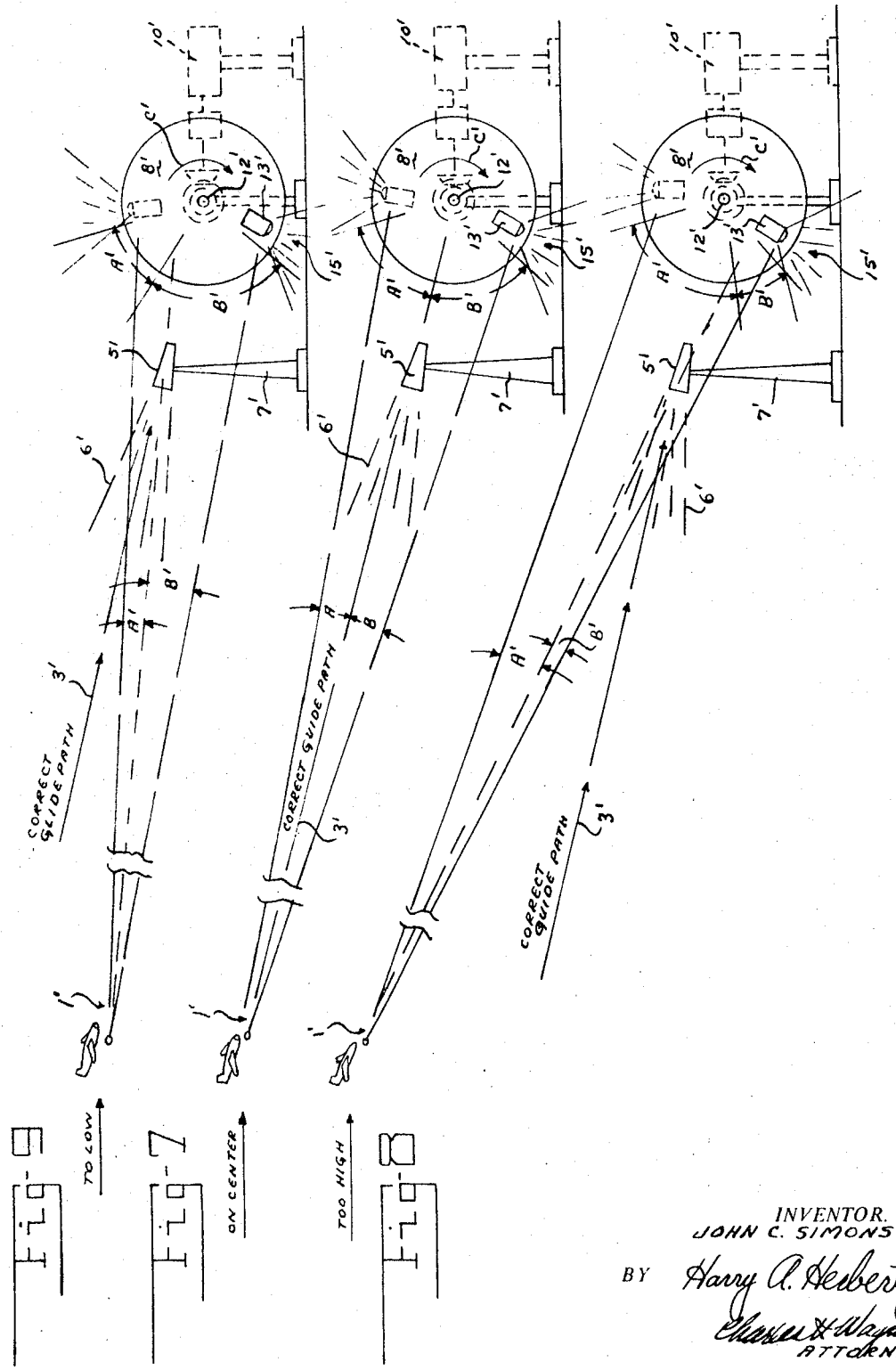

3,465,285
VEHICLE APPROACH DIRECTION INDICATING APPARATUS

John C. Simons, Dayton, Ohio, assignor to the United States of America as represented by the Secretary of the Air Force
Filed Apr. 5, 1967, Ser. No. 628,794
Int. Cl. G08g 5/00
U.S. Cl. 340—25          8 Claims

ABSTRACT OF THE DISCLOSURE

An aircraft or vehicle landing approach indicating apparatus having a fixed indicator light on the center line of a predetermined approach course, such as a landing strip, or on a predetermined guide path, and a second light in the form of a beacon which is slowly rotated in a circle around a pivotal center located materially behind the fixed light and on the center line of the desired glide path approach The fixed light is always in view in front of the rotating beacon light during an approach toward the apparatus and within a predetermined angle at either side of the center line or above or below the glide path. The apparatus produces an equal length visible sweep of the moving beacon light at opposite sides of the fixed light when approaching "on course," and an unequal visible length of sweep of the moving beacon light one one or the other sides of the fixed light when approaching "off course." The longer visible sweep of the rotating light at the side of the fixed light indicates the "off course" direction and amount to the aircraft or vehicle pilot. The beacon moves in a horizontal plane in the case of the center line of the landing strip or in a vertical plane in the case of the center line of a glide path and is fixed on a rotating platform, or on a pivoted arm, at a predetermined material radial distance from the pivot to sweep a circle of 360° behind the fixed light, but is only visible with the fixed light on the approach side through an arc somewhat less than 180°.

BACKGROUND OF THE INVENTION

The invention relates to illuminated devices for aircraft landing approach information to provide an effective simple landing approach or guide path indicatting apparatus, having for an object a simplified aircraft landing beacon device for directing the approach of an aircraft to a suitable area or strip, and may also be employed to indicate a substantially accurate predetermined glide path, as well as the substantially accurate landing approach with respect to the center line of a landing strip or center of the glide path.

SUMMARY OF THE INVENTION

The invention comprises a simple, easily erected portable device which eliminates radar beacons and other conventional fixed, complicated electrical apparatus, but employs instead a simple fixed light which is adapted to be located at or beyond the far end of the landing strip or approach and on the center line thereof with a slowly rotating beacon light located in rear of the fixed light and rotating in a fairly large circle or sweep of 360° behind the fixed light, with the pivot or center of the circle located on the landing strip center line behind the fixed light. The beacon light rotates in a substantially horizontal plane preferably located slightly above (or below) the position of the fixed light so that the sweep of the beacon light is visible with the fixed light through an arc or sweep of slightly less than 180°. In the event of the invention being used for a glide path indicator the beacon rotates in a circle perpendicular to the ground or landing strip in a plane through the landing strip center line with the fixed light and the center of rotation of the beacon located on the predetermined glide path for the particular type of aircraft being landed thereby.

A further object of the invention is to make the fixed light distinctive in intensity, or in color, to that of the rotating beacon and that the rotating beacon is visible with the fixed light on the approach side only, and through a material arc of nearly 180° horizontal sweep of the light of the beacon, whereby the visible position of the fixed light relative to its location in the visible sweep of the light from the rotating beacon determines the direction and substantially the amount of deflection, if any, off of the center of the landing strip, or when used as a glide path indicator indicates the direction and amount of the deflection in the actual glide path of the aircraft from a predetermined glide path.

Other objects and advantages of the invention will become apparent from the following description and accompanying drawings in which like reference characters refer to like parts in the several figures.

BRIEF DESCRIPTION OF THE DRAWINGS

FIGURES 1, 2 and 3 are diagrammatic plan views of a landing approach direction indicating apparatus employing the invention. FIGURE 1 schematically indicates the "on course" aircraft landing strip approach, while FIGURE 2 indicates on "off course" to the left approach to the landing area or strip, and FIGURE 3 illustrates a similar "off course" but to the right landing approach to an aircraft landing strip or area.

FIGURE 4 is a somewhat schematic front view of the apparatus as seen by the approaching vehicle or aircraft during an "on course" approach, such as disclosed in FIGURE 1.

FIGURE 5 is a view similar to FIGURE 4 but schematically showing a view of the apparatus from an aircraft during incorrect, to the left, approach as seen in FIGURE 2.

FIGURE 6 is view similar to FIGURES 4 and 5 but during an incorrect and to the right landing approach relative to the center line of the landing strip.

FIGURES 7, 8 and 9 are diagrammatic views illustrating the invention when used to indicate a predetermined guide path. FIGURE 7 illustrates the sweep of the beacon on the upper and lower side of the fixed light being equal, indicating the aircraft is on the predetermined proper glide path. FIGURE 8 is similar to FIGURE 7, but showing the aircraft as being too high or above the predetermed glide path, while FIGURE 9 illustrates the aircraft approaching too low, or below the desired glide path.

DESCRIPTION OF PREFERRED EMBODIMENTS

Referring to FIGURES 1, 2 and 3 the reference numeral 1 denotes the position of an approaching vehicle, such as an aircraft, located at some portion of the "approach" to a landing strip 2 having a central or "on course" landing area, diagrammatically indicated by the dot and dash line 3, usually determining the longitudinal center of the landing strip or area 2.

The visual guidance structure or device of the subject invention is generally indicated schematically at 4 and is preferably located at or slightly beyond the far end of the landing area or strip 2 and on the center line 3 thereof and comprises a fixed light 5 which projects a fairly wide beam of light 6 toward the approach end of the landing strip and may have a predetermined intensity, or a distinctive color, and is visible and distinguishable at a considerably remote distance from the approach end of the landing strip 2, even when approaching in a laterally off set, or angular relation to the center line. As seen in FIGURES 4 to 6 the fixed lamp or projector 5 is suitably supported above the center line 3 by a vertical standard 7 and has the diverging light beam which covers a fairly wide lateral angle or area at both sides of the center line 3.

Referring more particularly to FIGURES 4 to 6 a rotating support or platform 8 is provided having its pivotal center located on the center line 3 and is suitably journalled in a vertical bearing support 9 mounted on the center line 3 of the landing strip, preferably at the inner end thereof or beyond.

The rotating or rotatable platform 8 is uniformly driven by a motor 10 through suitable gearing 11, which may include speed reduction means, so as to rotate the platform slowly and uniformly around its pivotal center 12, which as before mentioned is located on the center line 3 of the landing strip. It is important that the platform 8 is preferably rotated very slowly, about 2 r.p.m., or slower, and carries fixed thereon a beacon light 13 which is located adjacent the periphery, to project a fairly wide light beam radially outward, as indicated at 14, during the rotation of the platform 8 around its pivotal center 12. The beam from the beacon 13 is indicated at 14 and the beacon 13 should be visible during the rotation of the platform throughout a considerable portion of the rotation of the platform 8 through almost 180°, so that the sweep of the light of the beacon 13 will be visible with the fixed light 5 through an arc of almost 180° in azimuth.

The fixed light 5 and the rotating beacon 13 may be energized by any suitable conventional means, forming no important part of the invention, for instance they may be connected to an electrical source such as batteries, or a separate power source, or even have a self contained energizing electrical source, for portability.

The device is particularly adaptable as a portable self contained aircraft landing device which can be easily and quickly placed in position on a "temporary" landing strip "in the field" for small aircraft, and for military aircraft landing operations, etc.

The operation of the device as shown in FIGURES 1 to 6 is as follows.

As the vehicle or aircraft approaches the landing strip 2, either directly "on course" or at a reasonable angle to either side of the selected landing strip center line 3, such as shown respectively in FIGURES 1, 2 or 3, or in FIGURES 4, 5 or 6, the operator or pilot observes the fixed light 5 and also the sweep of the rotating beacon 13 as it slowly moves through a material arc behind the fixed light 5, such as through an arc or sweep indicated at $A+B$. The light from the beacon 13 then disappears for an interval of time equal to about half the time required for a complete rotation of the beacon support 8 around the pivotal center 12. The sweep of the light or beacon 13 is continuously and uniformly repeated, moving from right to left as shown, or if desired from left to right.

The fixed light or beacon 5 is preferably of a different intensity or color from the beacon 13 so as to be easily distinguished from the rotating beacon, and may preferably be on a slightly different elevation so as not to blanket out the light from the rotating beacon 13.

Assuming that the support is rotating slowly and uniformly in the direction of the arrow C, when the vehicle or aircraft is approaching along the center line 3 of the landing strip 2 the operator or pilot will continuously observe the fixed light 5 and periodically see the sweep of the beacon 13 moving horizontally across the position of the fixed light 5 from right to left as seen in FIGURES 1 to 6. Assuming that the support 8 is rotating at about 2 r.p.m. it will take about one minute or a slightly less time interval between the "appearance" and "disappearance" of the beacon light or beam 13 at the beginning and end of its visible sweep.

When the length of visible sweep of the beacon 13 at each side of the fixed light 5 (arcs A and B in FIGURES 1 and 4) are observed to be equal by the operator or pilot of the vehicle, this indicates that the vehicle is substantially "on course," or approaching over the center 3 of the strip 2.

Should the operator or pilot of the approaching vehicle or aircraft observe the longer visible sweep of the beacon 13 to the left of the fixed light 5 as seen in FIGURES 2 and 5, this would indicate that the direction of the course was angling to the left of the proper approach along the center line 3 and the course should be changed or directed to the right or toward the shorter visible arc of light B' until the lengths of the visible sweeps of the beacon light at opposite sides of the fixed light 5 appear equal.

Should the pilot or operator of the aircraft or vehicle observe that the length of the visible arc or sweep of the rotating beacon light 13 is greater on right hand side of the fixed light 5 than on the left side of the fixed light 5, as seen in FIGURES 3 and 6, as represented by the arcs B'' and C'', this could indicate that his course was not correct, and again, he should change his course by bearing to the left or toward the direction of the shorter side visible sweep of the beacon 13 relative to the fixed light 5 and maintain this course until the lengths of visible sweeps of the beacon 13 at opposite sides of the fixed light 5 again become equal.

In each instance the operator changes or angles his course in the direction toward the shorter visible beacon light sweep side of the fixed light 5 and away from the longer sweep until the lengths of the sweep of the visible beam light 15 on opposite sides of the fixed light are equal. This is also true regardless of the direction of rotation of the platform or beacon lamp support 8. Of course, the platform could be rotated somewhat faster (or slower) than the indicated 2 r.p.m.

However the circular visible sweep of the rotating beacon 13 should be of such a diameter that an appreciable sweep $(A+B)$ of the beacon can be observed at the opposite sides of the fixed light 5 when the approaching craft or vehicle is on an appreciable angular course relative to the center 3 of the landing approach as seen, possibly somewhat exaggerated in FIGURES 2, 3 and 5, 6, and while at a somewhat remote approach distance from the landing strip 2. Where a colored or low intensity fixed light 5 is employed and a high intensity rotating beacon is used a radius of rotation of the beacon 15 of 10 to 15 feet or even less may be used, and the visible sweep of the beacon 15 relative to the fixed light 5 could be easily observed from a considerable distance, possibly over a mile or two.

Referring to FIGURES 7, 8 and 9 in which the invention is used to determine a substantially predetermined aircraft glide path, the detail structure for carrying out this form of the invention is substantially the same as before described except that the rotating beacon light moves in a vertical plane instead of the horizontal plane. The same referenced numerals as applied in FIGURES 1 to 6 will be employed, except that they will be primed.

The position of the approaching aircraft is indicated at 1' while the proper and predetermined glide path for the particular aircraft utilizing the device is denoted at 3' with the fixed light on the glide path indicated 5' and supported at the desired elevation and inclination by a suitable support or standard 7'.

The inclination or direction of the center line 3' of the glide path passes through central or optical axis of the fixed light 5' and a rotary beacon pivotal support 8' and is disposed to rotate in a vertical plane around a horizontal pivotal center 12' which is located on the center line of the glide path 3'.

The beam from the fixed light or projector is indicated at 6' while the beacon 13' which is fixed on the rotating support 8' and has a wide light beam 15' which is visible behind the fixed light 5' through a continuous arc or sweep which is preferably only slightly less than 180° after which it is not visible with the beam of the fixed light 5' through an arc or rotation of the support 8' slightly more than 180°.

The rate of rotation of the "platform" or support 8' is preferably fairly slow, around 2 r.p.m., so that the movement of the beacon 13' remains clearly visible to the approaching aircraft through a sweep of the beacon 13' of about 160, more or less degrees, and then becomes invisible throughout the other half of the 360° of the circular sweep of the beacon 13'.

The rotary support 8' is suitably driven by a motor 10', preferably through conventional reduction gearing, not shown.

When an aircraft is approaching on the prescribed or proper glide path for that particular aircraft, such as indicated at 1' in FIGURE 7, the pilot should observe the fixed light 5 and the intermittent sweeps of the rotating beacon 13' behind the fixed light 5', and will note that the visible sweep B' of the beacon 13' below the fixed light 5', assuming that the direction of rotation of the support 8' for the beacon is indicated by the arrow C", and the visible sweep A' of the beacon 13' below the fixed light are equal.

When above the glide path and in a too steep glide, the portion of the visible sweep of the beacon 13', observed below the fixed light 5' will be much shorter than the sweep of the beacon 13' visible above the fixed light 5'. This will indicate that the pilot should lose more altitude until he again observes that both portions of the sweep of the beacon light are equal. At this time the aircraft will be on the prescribed glide path.

FIGURE 9 illustrates the aircraft coming in too low, because the lower visible sweep of the beacon 13' below the fixed light 5' is much longer than the visible sweep of the beacon 13' above the fixed light 5'. In either case the pilot must change his course toward the shorter portion of the visible sweep of the beacon 13' behind the fixed light 5' to again return to the proper glide path.

The fixed light 5" should be distinctive in intensity or in color to that of the rotating beacon 13', as in the case of the invention shown in FIGURES 1 to 6.

It is also contemplated that the rotating beacon 5 or 5' may be in the same plane 3 or 3' with the rotating beacon 13 or 13' so that as the beacon 13 or 13' passes behind the fixed light the light from the rotating beacon is momentarily blanketed or cut off, especially when the fixed light intensity is low or of a distinctive color. This would produce two equal long flashes of light, interrupted therebetween by the fixed lamp 5 when "on course," and one longer and one shorter flash followed by the much longer interruption or disappearance of the beacon light as it passes around the back or far side of the pivotal center 12 or 12' of the support. If the "long" flash follows the interruption, assuming the rotation of the beacon support was in the direction of the arrow C or C' this would indicate that the approach was off, and to the right as in FIGURE 3 (or too low as in FIGURE 9), while if the short flash followed the long interruption this would indicate that the "off course" direction was too far to the left as in FIGURE 2, (or too high as in FIGURE 8).

For purposes of examplification of the invention a particular embodiment of the invention has been shown and described to the best understanding thereof.

I claim:

1. A vehicle approach direction indicating means comprising: a stationary light adapted to be fixed in the center of a predetermined vehicle approach, adjacent the end thereof, facing toward the vehicle approach direction, having a wide angle visible light beam adapted to face toward an approaching vehicle when on a wide predetermined approach angle between either side of the center of said predetermined approach direction, a beacon light completely rotatable in a circle behind said fixed light in a plane through said predetermined approach direction having a predetermined appreciable radius with the center of rotation of said beacon light adapted to be located on the center of said approach direction and intermittently visible with said fixed light from an approaching vehicle through a material predetermined arc of rotation of said beacon light less than 180° when the vehicle is approaching toward said fixed light in said approach direction between the center thereof and said predetermined appreciable angles at either side of said center, and then not visible with said fixed light to said approaching vehicle through a subsequent arc of rotation of said beacon light behind said center exceeding 180°, and means for rotating said beacon light around said center at a predetermined uniform rate during an approach of a vehicle in said approach direction toward said fixed light.

2. An aircraft predetermined landing approach determining apparatus having a converging landing approach angle with a predetermined directional approach midway between the opposite sides of said angle, a beacon light continuously rotatable around a circle at a slow predetermined uniform rate, having a material predetermined radius with its center of rotation located substantially on said predetermined directional approach in a plane perpendicular to said plane of said landing approach angle adjacent to the inner converging end of said landing approach angle, said beacon light having a light beam visible from a remote approaching aircraft within said landing approach angle and at either side of said directional approach, during a substantially half rotation of said beacon light through said landing approach angle and subsequently not visible by the approaching aircraft through more than the succeeding substantially half rotations of said beacon light around said center, an indicator light fixedly mounted within said landing approach angle in front of said rotatable beacon light in a plane through said directional approach, perpendicular to said approach angle, said indicator light visible with said rotating beacon light by an approaching aircraft within said approach angle, whereby the position of the indicator light in the length of visible sweep of the beacon light at either side of the fixed light when observed from the approaching aircraft indicates the direction and substantially the amount of deviation of the approaching aircraft in the landing approach angle from the said predetermined directional approach.

3. A landing approach determining system as set forth in claim 2 in which said indicator light is clearly distinct from and visible with the visible sweep of the rotating beacon during the portion of the rotation of the beacon light between the indicator light and the center of rotation of the beacon light, from an aircraft approaching from a distance in a direction toward said indicator light at any predetermined material angle at either side of said predetermined directional approach.

4. An aircraft predetermined landing approach device as set forth in claim 3, including power means for uniformly rotating said beacon light continuously around said center in the same direction at a sufficiently predetermined slow rate, having a sufficient radius of rotation from said center to clearly discern the length of sweep of the beacon light behind the fixed indicator light at either side thereof from an approaching aircraft making a landing approach toward said indicator light from a predetermined remote distance away from said indicator light.

5. A device as set forth in claim 4 in which said length of sweep of the beacon visible light behind the light from said indicator light appears equal when viewed from an approaching aircraft substantially on the center of said predetermined directional approach, and appears unequal to the approaching aircraft when the aircraft is approaching the indicator light from either side of said predetermined directional approach.

6. A vehicle approach determining apparatus for optically indicating a predetermining approach direction to an approaching vehicle comprising a rotary supporting platform having an appreciable radius with a center of rotation adapted to be fixed on the center line of said approach direction, a beacon light fixed on said supporting platform adjacent the periphery thereof having a radially outward light beam adapted to be visible to a vehicle approaching said platform from a distance at an appreciable approach angle at either side of the aforesaid center line during a predetermined material portion of the revolution of said platform, and not visible to the approaching vehicle during the succeeding major portion of each revolution of said platform, to intermittently present and interrupt the visible sweep of the beacon light to the approaching vehicle, power means for rotating the supporting platform at a uniform slow rate of substantially about 2 r.p.m. to provide an intermittent visible slow sweep of said beacon light across said vehicle approach direction during the vehicle approach, an indicator light having an outwardly diverging light beam which is distinctive from the beacon light, said indicator light being adapted to be fixed on the aforesaid center line between the supporting platform and the approaching vehicle, said indicator light having a light continuously visible to the approaching vehicle with the intermittent visible sweep of the beacon light throughout said appreciable approach angle while the vehicle is approaching at either side of said center line, whereby the length of the visible sweep of the beacon light at either side of the distinctive indicator light is equal while the vehicle is approaching the indicator light on the aforesaid center line, and the apparent relative shorter visible sweep of the beacon light, when observed from an aproaching vehicle at one side of the indicator light following each interruption of the beacon visible light beam indicates an angular approach at one side of the aforesaid center line and indicates the necessary change in direction toward the apparent shorter visible sweep of the beacon light to direct the vehicle toward the aforesaid center line, where the visible sweep of the beacon light at both sides of the indicator light will appear equal to the approaching vehicle.

7. An approach determining apparatus as set forth in claim 6 in which the rotating platform is horizontally supported at the far end of an aircraft landing strip, and the said center line comprises the longitudinal center of the landing strip, and the circle of slow rotation of the beacon light about said center is such that the length of the visible sweep of the beacon light horizontally across the position of the visible indicator light is sufficient to be clearly discernible from an approaching aircraft while making a landing approach toward the landing strip.

8. A landing approach determining apparatus as set forth in claim 6 in which the aforesaid center line determines a substantially predetermined glide path for an aircraft making the landing approach, and the beacon light supporting platform is rotatable in a vertical plane adjacent the inner end of the glide path substantially parallel to the center line of the glide path about a horizontal pivot in a plane through said center line having an axis perpendicular to said center line, and said indicator light is fixedly supported in the center of said glide path forwardly of said platform in adjacent spaced relation to the periphery of said platform to project a diverging light beam upwardly and outwardly away from said platform along said center line of said glide path, and at an appreciable predetermined angle above and below said glide path.

References Cited
UNITED STATES PATENTS 2,719,282   9/1955   Roth _____ 340—25
3,133,263   5/1964   Norberg _____ 340—25

ALVIN H. WARING, Primary Examiner

U.S. Cl. X.R.
240—1.2; 340—29